J. W. EAST.
INTAKE FOR PNEUMATIC CONVEYERS.
APPLICATION FILED DEC. 29, 1908.
955,952.
Patented Apr. 26, 1910.
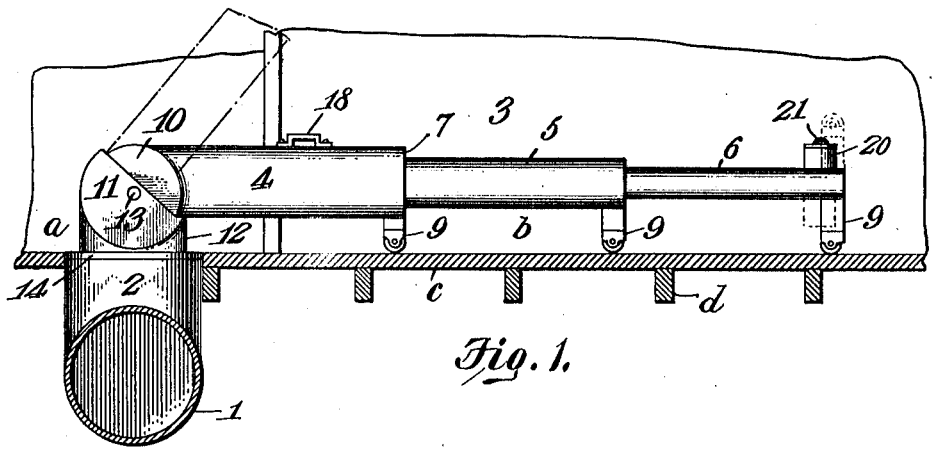
Fig. 1.
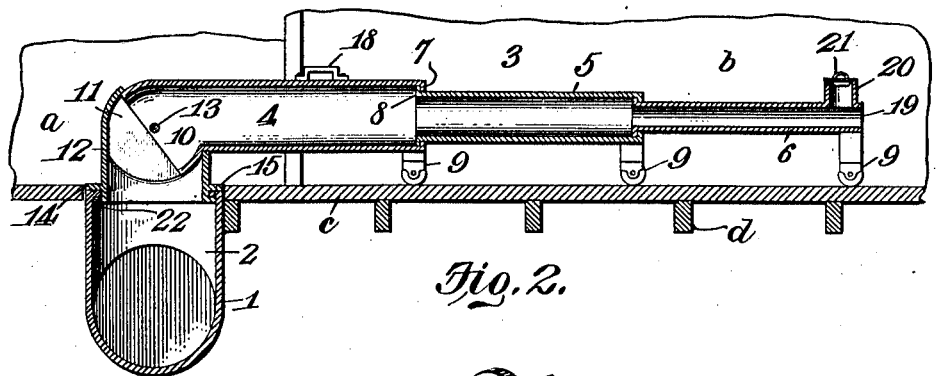
Fig. 2.
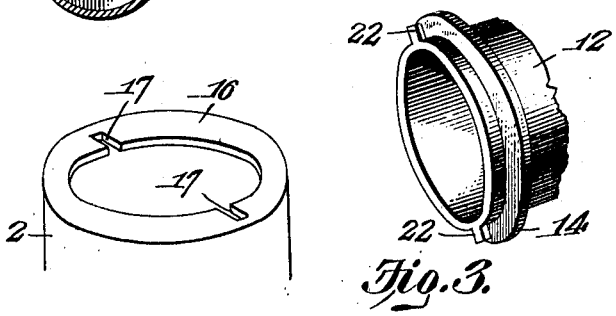
Fig. 4.
Fig. 3.
Inventor
James W. East,
Witnesses
By Victor J. Evans
Attorney

UNITED STATES PATENT OFFICE.

JAMES W. EAST, OF LORMAN, MISSISSIPPI.

INTAKE FOR PNEUMATIC CONVEYERS.

955,952. Specification of Letters Patent. Patented Apr. 26, 1910.

Application filed December 29, 1908. Serial No. 469,819.

*To all whom it may concern:*

Be it known that I, JAMES W. EAST, a citizen of the United States, residing at Lorman, in the county of Jefferson and State of Mississippi, have invented new and useful Improvements in Intakes for Pneumatic Conveyers, of which the following is a specification.

This invention relates to improvements in pneumatic conveyers particularly of the type employed for conveying seed cotton from the storage room or bin to the gins and consists essentially of a longitudinally adjustable intake duct adapted to be readily placed on the floor of a cotton gin or storage room turned to any part of the floor of such bin or storage room and attached to the main conveyer duct of the pneumatic conveyer system, so that the said extensible intake duct may be employed for the purpose of taking the seed cotton from the bins or storage room and delivering the same to the pneumatic conveyer duct which serves to direct the seed cotton to the gin room and hence avoid the necessity of handling the seed cotton manually in the gins or storage rooms and correspondingly decreasing the cost of conveying the seed cotton from such bins or storage rooms to the gin.

My invention further consists in the construction, combination and arrangement of devices hereinafter described and claimed.

In the accompanying drawings:—Figure 1 is a sectional view of a portion of a gin house or seed cotton storage house provided with a pneumatic intake duct constructed in accordance with my invention, said intake duct being shown attached to the pneumatic conveyer duct which is located under the floor of the hall or passage between the bins or store room and disposed in one of the store rooms, in operative position on the floor thereof, the said intake duct being shown in elevation and the said conveyer tube being shown in section. Fig. 2 is a similar view in which the intake duct and the conveyer tube are both shown in section. Fig. 3 is a detail perspective view of the elbow joint or tube section. Fig. 4 is a similar view of the upper portion of the intake arm of the pneumatic conveyer tube.

In Figs. 1 and 2 of the drawings, a portion of a hall or passage between series of storage bins or rooms is indicated at *a*, one of said storage bins or rooms being indicated at *b*, the floor being indicated at *c* and some of the joists at *d*.

As is usual in gin houses and seed cotton storage houses equipped with a pneumatic conveyer system for handling the seed cotton, the pneumatic conveyer tube indicated at 1 is located under the floor of the hall or passage *a* and is provided with vertically extending intake arms 2 which extend through openings in the floor of the hall or passage and are disposed opposite the doors of the bins or store rooms. Heretofore, it has been the practice to manually rake or shovel the seed cotton from the bins or store rooms into the upper ends of the said intake arms 2 so as to feed the seed cotton to the pneumatic conveyer tube 1 for delivery or conveyance from the bins or store rooms to the gin or gin room of the building. Such manual handling of the seed cotton is very laborious and correspondingly expensive.

It is the purpose of my invention to provide a pneumatic intake or feed device for use in connection with the pneumatic conveyer tube 1 and which may be readily operated by one man, placed in each bin or store room in succession, connected to the pneumatic conveyer tube 1 and caused to pneumatically convey the seed cotton from the bins or store rooms to the said pneumatic conveyer tube so as to entirely dispense with the manual labor heretofore found necessary for this purpose.

In accordance with my invention, I provide a pneumatic feed or intake tube 3 which is composed of a number of sections connected together and telescopically disposed so that the said intake tube may be adjusted to any desired length while being operated. In the drawings I show the said intake tube as composed of an inner section 4, an intermediate section 5 and an outer section 6. The inner and intermediate section or sections are provided with inwardly extending flanges 7 and the outer and intermediate section or sections are provided at their inner end with outwardly extending flanges 8, said flanges 7, 8, as will be understood, coacting to effect tight joints between the sections and to also enable the sections to be moved longitudinally as may be required in adjusting the pneumatic intake tube. Each of the sections is provided under its outer end with a supporting caster 9 or other equivalent device to reduce friction and to carry the weight of the pneumatic intake tube. The inner section 4 is provided with a substantially semi-cylindrical end 10, the axis of which is at right angles to that of the section. The said substantially semi-cylindrical end of the said inner section is fitted snugly in the correspondingly shaped upper, socket portion 11 of the elbow joint or tube section 12. The said jointed semi-cylindrical portion of the section 4 and elbow 12 are pivoted together as at 13 and hence the pneumatic intake tube may be disposed at any desired angle with reference to the elbow 12 with which it is jointed. Said elbow 12 is provided near its lower end with a flange or collar 14 to bear on the upper end of any of the vertical arms 2 of the pneumatic conveyer tube 1 and to fit in an opening 15 in the floor in which said upper end of said arm 2 is disposed so that the said elbow or flexible joint at the inner end of the intake tube may be connected to any of the arms 2 of the conveyer tube 1.

In Fig. 2 of the drawing, the arm 2 is shown as provided at its upper end with an inwardly extending flange 16 having notches 17 in opposite sides and in Fig. 3, the lower end of the joint 12 is shown as provided with lugs 22 to clear said notches and engage the under side of said flange excepting when said lugs directly register with said notches, so that said lugs and flange, together with the collar or flange 14 of the joint 12 coact to detachably and pivotally connect the inner end of the pneumatic intake tube to the conveyer tube 1 and hence it will be evident that the said pneumatic intake tube may be moved angularly on the floor of a bin or store room as may be required to cause it to act upon all of the seed cotton in such bin or store room and it will also be evident that owing to the pivotal connection between the inner end of said pneumatic intake tube and the elbow of joint 12, said intake tube may be disposed at any angle in a vertical plane that may be required to cause it to act upon all of the seed cotton in a bin or store room.

To facilitate the carrying, handling and manipulation of my improved pneumatic intake tube or conveyer feeder, I provide the inner section 4 thereof with a handle 18 on its upper side.

In practice, my improved pneumatic intake or feed tube is so light and portable that it may be readily carried by a single person and connected for use in any bin or store room.

The intake end of the outer section 6 of my improved pneumatic intake tube or conveyer feeder is provided with an opening 19 and also with an elbow 20 either of which may be employed as required to cause the exhaust blast through the tube 1 and the feed tube 3 to suck the seed cotton into the seed tube and hence cause the same to be fed to the conveyer tube 1. A closure or cover 21 is provided which may be employed for closing either the end 19 of the section 6 or the elbow 20 thereof as may be required.

What is claimed is:—

In combination with a pneumatic conveyer tube having an intake arm, a pneumatic feed tube provided at its inner end with a substantially semi-cylindrical portion, the axis of which is at right angles to that of said feed tube and an elbow or joint at the inner end of the intake tube, said elbow or joint being provided with a socket portion corresponding in shape with that of the semi-cylindrical end of the feed tube and of a size to receive said semi-cylindrical end of said feed tube, the semi-cylindrical end of said feed tube being pivotally mounted in said socket and means to connect said elbow joint detachably to said intake arm for revoluble movement.

In testimony whereof I affix my signature in presence of two witnesses.

JAMES W. EAST.

Witnesses:
RICHARD ROSS WADE,
C. A. REGAR.